(12) United States Patent
Shintomi

(10) Patent No.: US 7,420,296 B2
(45) Date of Patent: Sep. 2, 2008

(54) POWER SUPPLY CIRCUIT

(75) Inventor: Yuji Shintomi, Tomiya-Machi Kurokawa-Gun (JP)

(73) Assignee: Freescale Semiconductor, Inc., Austin, TX (US)

( * ) Notice: Subject to any disclaimer, the term of this patent is extended or adjusted under 35 U.S.C. 154(b) by 126 days.

(21) Appl. No.: 11/508,618

(22) Filed: Aug. 23, 2006

(65) Prior Publication Data

US 2007/0046106 A1    Mar. 1, 2007

(30) Foreign Application Priority Data

Aug. 30, 2005    (JP)    ............................. 2005-249128

(51) Int. Cl.
    *H02J 1/00*    (2006.01)
(52) U.S. Cl. .......................................... 307/80; 307/85
(58) Field of Classification Search .................. 307/64, 307/80, 85, 43
    See application file for complete search history.

(56) References Cited

U.S. PATENT DOCUMENTS 5,887,270 A * 3/1999 Brant et al. ................. 711/162

2004/0015732 A1    1/2004  El-Kik et al.
2006/0273767 A1*  12/2006  Fujii ........................... 323/224
2007/0018502 A1*   1/2007  Bazinet ........................ 307/80

FOREIGN PATENT DOCUMENTS

| JP | 61-258628     |   | 11/1986 |
| JP | 2001331241 A  |   | 11/2001 |
| JP | 2003167651 A  |   | 6/2003  |
| JP | 2004234596 A  |   | 8/2004  |
| JP | 2005124317 A  |   | 5/2005  |

* cited by examiner

*Primary Examiner*—Michael J Sherry
*Assistant Examiner*—Michael Rutland Wallis
(74) *Attorney, Agent, or Firm*—Charles Bergere

(57) ABSTRACT

A control circuit for a power supply circuit that selects an appropriate power source to continuously supply power. The control circuit includes a power synthesizing circuit for generating synthesized power by synthesizing a first power supplied from a regulator and a second power supplied from a regulator, or battery power and bus power, so that each circuit of the control circuit is operated by the synthesized power. Operation of the control circuit is enabled even if the supply of one power is stopped. The first switch device and the second switch device are controlled to select the appropriate power source in accordance with the currently supplied power so that power is continuously supplied.

2 Claims, 3 Drawing Sheets

| Sor | Sbus | clr1 | set1 | clr2 | set2 | SW1 | SW2 | STATE |
|---|---|---|---|---|---|---|---|---|
| X | X | X | X | X | X | X | X | NOPOWER |
| X | 0 | 0 | 1 | 1 | 0 | ON | OFF | VBATONLY |
| 0 | 1 | 1 | 0 | 0 | 1 | OFF | ON | VUSBONLY |
| 1 | 1 | 0 | 0 | 0 | 0 | - | - | VBAT,VUSB |

# POWER SUPPLY CIRCUIT

BACKGROUND OF THE INVENTION

The present invention relates to a power supply circuit.

In the prior art, portable electronic devices, such as MD players and the like, are operated by a power supply, such as a rechargeable battery. Recent portable devices are capable of transferring data to/from external devices, such as a personal computer (PC) and the like, through a communication cable complying with the universal serial bus (USB) standard, the Institute of Electrical and Electronics Engineers (IEEE) 1394 standard, or the like.

Interface standards, such as the USB standard, specify a communication cable that is capable of supplying power. An external device is constructed so that it can supply the specified power. Therefore, many portable electronic devices operate on power (bus power) supplied from an external device through a communication cable when the portable device is connected to the external device and operate on battery power from, for example, a rechargeable battery, when the portable device is not connected to the external device.

Japanese Laid-Open Patent Publication No. 2005-124317 describes a bus powered device in which power is supplied from an external device through a communication cable or from a battery. The power is selectively supplied to a CPU and power load by a switch device controlled by the CPU. Publication No. 2005-124317, the CPU that controls the switch device is also operated by the single power selected from the two power sources. This may disable control of the switch device. For example, when the CPU is operated by the power supplied from an external device through the communication cable, unplugging of the communication cable would interrupt the power from the external device. Thus, the supply of power to the CPU would stop, and the switch device cannot be switched so as to continue operation. In the same manner, the switch device cannot be controlled when power is not supplied to the CPU, such as during startup.

Therefore, the anodes of two diodes may respectively be supplied with power from a battery and from a communication cable. In this case, the cathodes of the two diodes are connected to each other so that power is supplied to the CPU and power load from a node between the cathodes. In this configuration, however, a voltage drop may occur between the anode and cathode of the diodes, and the cutting of one power supply cannot be ensured. This would be inefficient from the viewpoint of power consumption.

SUMMARY OF THE INVENTION

It is an object of the present invention to provide a control circuit, power supply circuit, and electronic device that select an appropriate power source to enable power to be continuously supplied.

One aspect of the present invention is a power supply circuit including a first switch device connected between a load circuit and a first power source supplying first power, a second switch device connected between the load circuit and a second power source supplying second power, and a control circuit for controlling the first switch device and the second switch device. The control circuit controls the first switch device, which is connected between the load circuit and the first power source supplying the first power, and the second switch device, which is connected between the load circuit and the second power source supplying the second power. The control circuit includes a power synthesizing circuit for generating a third power by synthesizing the first power and the second power. A first voltage detection unit, operated by the third power, detects voltage of the third power and outputs a first detection signal. A second voltage detection unit, operated by the third power, detects voltage of the second power and outputs a second detection signal. A signal generation unit, operated by the third power, generates a first control signal and a second control signal to activate and inactivate the first switch device and the second switch device in a complementary manner based on the first detection signal and the second detection signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described with reference to the drawings.

Figure 1:
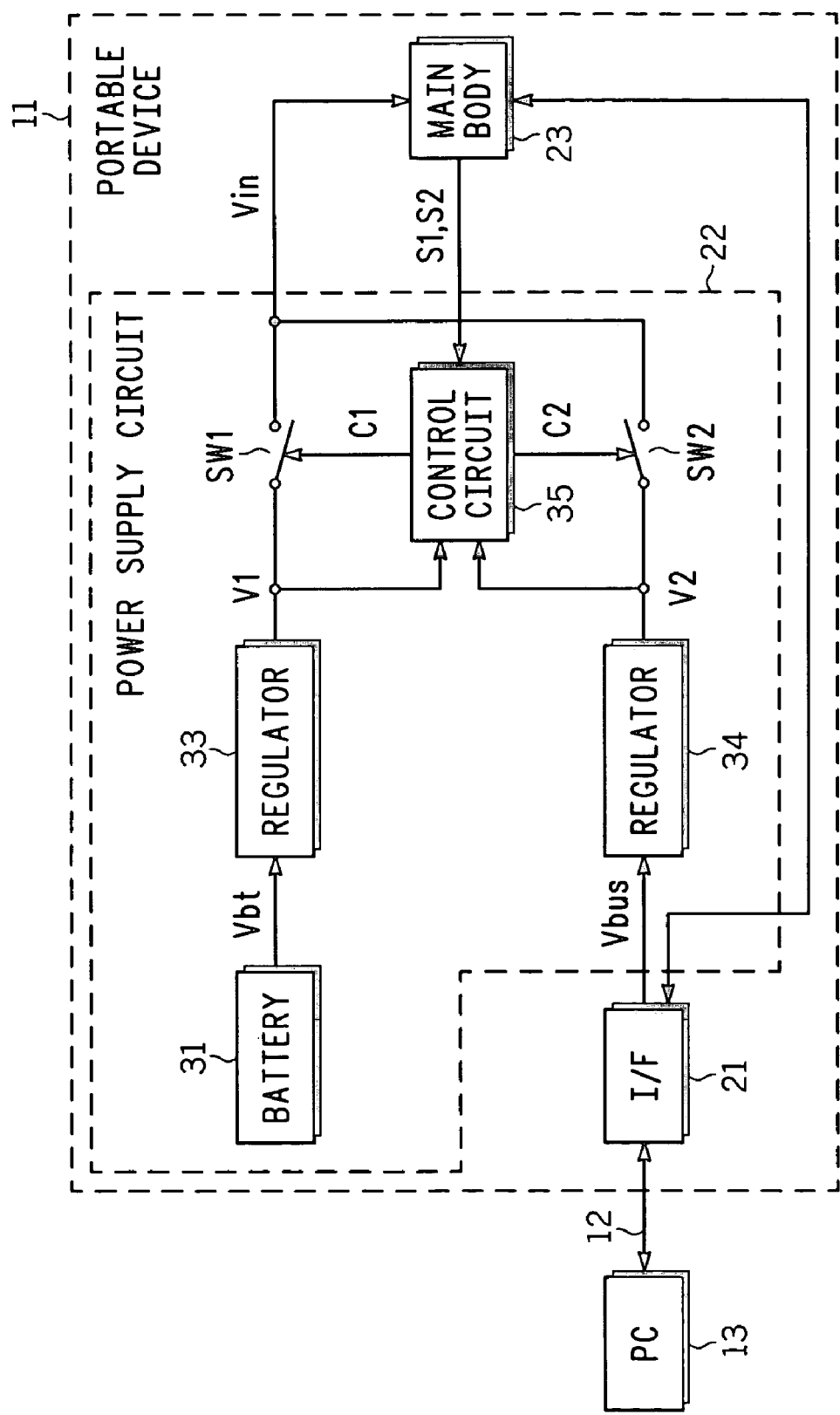
FIG. 1 is a block diagram of a portable device according to a preferred embodiment of the present invention.

As shown in FIG. 1, an electronic device 11 is connected to a personal computer (PC) 13, which functions as an external device, by a cable 12. The electronic device 11 includes an interface (I/F) circuit 21 that is in compliance with the universal serial bus (USB) standard. The PC 13 also includes a USB standard interface (I/F) circuit (not shown) and is provided with a communication function that is in accordance with the USB standard and a function for supplying power of a predetermined voltage and predetermined current to connected devices. The cable 12 is a USB standard communication cable, and transmits communication data and power. Bus power Vbus, which is supplied from the PC 13 to the electronic device 11 through the cable 12, is output from the I/F circuit 21 of the electronic device 11 to a power supply circuit 22. Communication data, which is provided from the PC 13 to the electronic device 11 through the cable 12, is output from the I/F circuit 21 of the electronic device 11 to a device main body 23.

The power supply circuit 22 includes a battery 31. A primary cell, such as a manganese battery or an alkaline battery, or a secondary cell, such as a lithium ion battery, may be used as the battery 31. The power supply circuit 22 supplies the device main body 23 with power from the battery 31 or power from the I/F circuit 21, that is, internal power Vin, which is generated with the bus power Vbus supplied from the PC 13 to the electronic device 11 through the cable 12. The electronic device 11 is an MD player in the preferred embodiment, and the device main body 23 includes a drive mechanism and control circuit for a recording medium, and circuits for recording and reproducing data with the recording medium, and the like. The device main body 23, which is operated by the internal power Vin from the power supply circuit 22, performs the recording and reproduction of data, communication with the PC 13, and the like. The circuits for recording and reproducing data are operated by voltage, which differs from that of the internal power Vin. Although not shown in the drawings, the power supply circuit 22 supplies an operating voltage to the circuits for recording and reproducing data, and the like. The operating voltage supplied to the circuits that record and reproduce data, and the like is generated through a control executed after activation of an MCU, which controls the power supply circuit 22.

The battery 31 is connected to a first regulator 33. The first regulator 33 generates a first voltage V1 obtained by adjusting and stabilizing voltage of the battery power Vbt output from the battery 31. The bus power Vbus is supplied to a second regulator 34. The second regulator 34 generates a second power V2 obtained by adjusting and stabilizing voltage of the bus power Vbus. The voltage values of the first power V1 and second power V2 are the same. Further, these voltage values correspond to the drive voltage of a control circuit 35 of the device main body 23.

A first terminal of a first switch device SW1 is connected to the output terminal of the first regulator 33, and a first terminal of a second switch device SW2 is connected to the output terminal of the second regulator 34. A second terminal of the first switch device SW1 and a second terminal of the second switch device SW2 are connected to each other. A node between the second terminals is connected to the device main body 23. The first switch device SW1 and the second switch device SW2 each have a control terminal for controlling activation and inactivation. The control terminals are connected to the control circuit 35.

The first power V1 output from the first regulator 33 and the second power V2 output from the second regulator 34 are input to the control circuit 35. The control circuit 35 monitors the voltage values of the first power V1 and the second power V2. Further, the control circuit 35 outputs control signals C1 and C2 so as to control activation and inactivation of the first switch device SW1 and second switch device SW2 based on the monitoring result.

Command signals S1 and S2 from the MCU (not shown) of the device main body 23 are input to the control circuit 35. The control circuit 35 shifts the levels of the control signals C1 and C2 to control the activation and inactivation of the first switch device SW1 and the second switch device SW2 in accordance with the command signals S1 and S2.

When the first switch device SW1 is activated, the first power V1, which is based on the battery power Vbt of the battery 31, is supplied to the device main body 23 as the internal power Vin via the first switch device SW1. When the second switch device SW2 is activated, the second power V2, which is based on the bus power Vbus supplied through the cable 12, is supplied to the device main body 23 as the internal power Vin via the second switch device SW2.

The control circuit 35 selects either one of the first power V1 and second power V2, that is, either the battery power Vbt or bus power Vbus, as the power source. Therefore, the power supply circuit 22 outputs the internal power Vin based on the power supplied from the power source selected by the control circuit 35.

Figure 2:
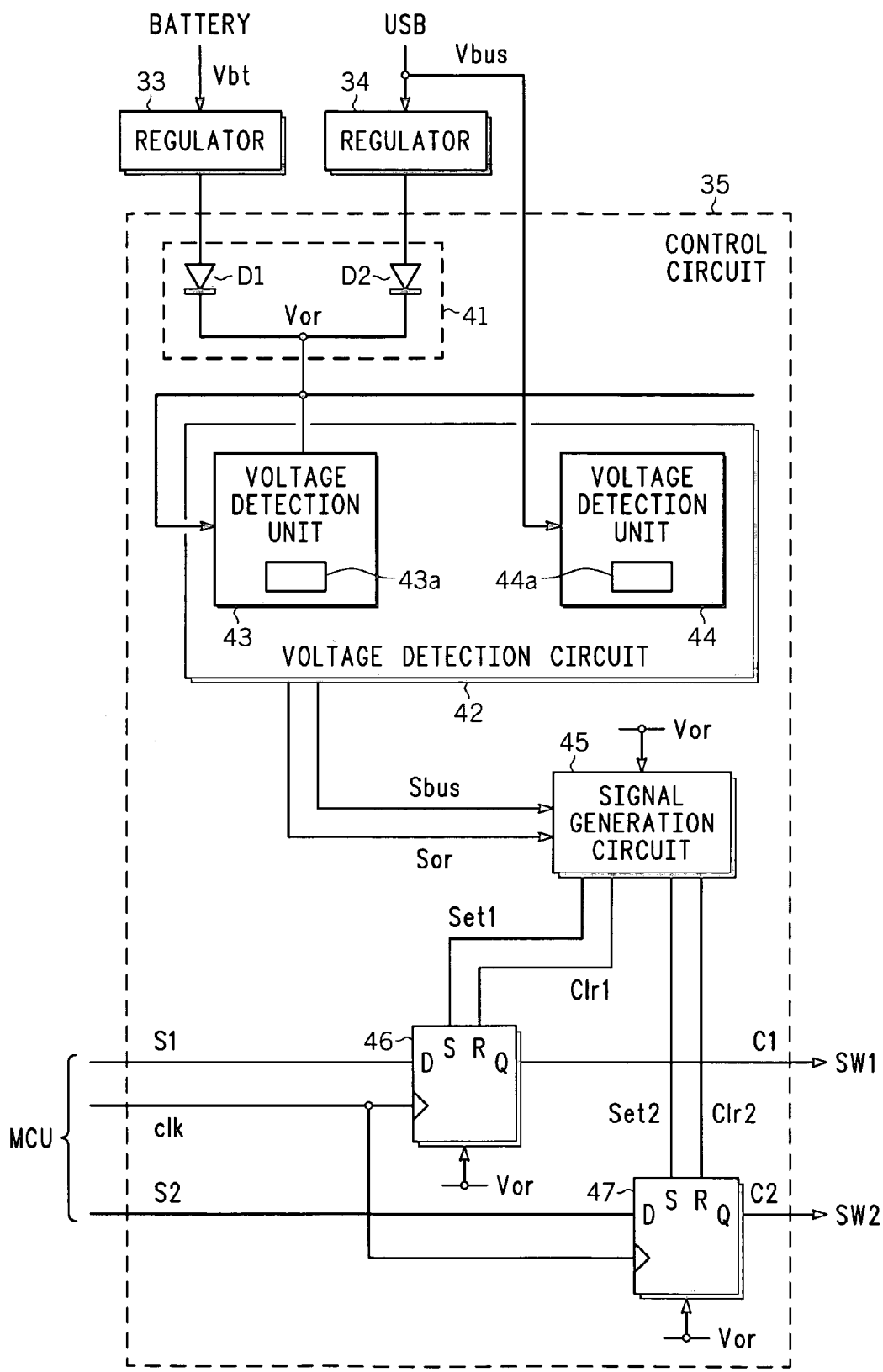
FIG. 2 is a block diagram of a control circuit.

As shown in FIG. 2, the control circuit 35 includes a power synthesizing circuit 41, a voltage detection circuit 42, a signal generation circuit 45 functioning as a signal generator, and flip-flop circuits (FF circuits) 46 and 47 functioning as a signal generation unit and holding circuit. The voltage detection circuit 42 includes a first voltage detection unit 43 and a second voltage detection unit 44. The powers V1 and V2 are supplied from the regulators 33 and 34 to the power synthesizing circuit 41. The power synthesizing circuit 41 includes two diodes D1 and D2. The first power V1 is supplied to the anode of the first diode D1, and the second power V2 is supplied to the anode of the second diode D2. The cathode of the first diode D1 and the cathode of the second diode D2 are connected to each other. The power synthesizing circuit 41 generates synthesized power Vor by synthesizing the first power V1 and second power V2 with the first diode D1 and second diode D2. The synthesized power Vor is supplied to circuits 43 to 47 in the control circuit 35. Accordingly, the control circuit 35 is supplied with at least one of the first power V1 and second power V2. That is, the control circuit 35 operates as long as at least one of the battery power Vbt of the battery 31 and the bus power Vbus is supplied.

The first voltage detection unit 43 of the voltage detection circuit 42, which is operated by the synthesized power Vor, detects the voltage of the synthesized power Vor. Specifically, the first voltage detection unit 43, which includes a reference power supply 43a for generating a predetermined voltage, compares the voltage of the synthesized power Vor with the voltage (first reference voltage) of the reference power supply 43a. The second voltage detection unit 44 of the voltage detection circuit 42, which is operated by the synthesized power Vor, detects the voltage of the bus power Vbus. Specifically, the second voltage detection unit 44, which includes a reference power supply 44a for generating a predetermined voltage, compares the voltage of the bus power Vbus with the voltage (second reference voltage) of the reference power supply 44a. The voltage detection circuit 42 generates a first detection signal Sor and a second detection signal Sbus based on the comparison results of the two voltage detection units 43 and 44. For example, based on the detection result of the first voltage detection unit 43, the voltage detection circuit 42 generates a high level first detection signal Sor when the voltage of the synthesized power Vor is higher than the first reference voltage and generates a low level first detection signal Sor when the voltage of the synthesized power Vor is lower than the first reference voltage. In the same manner, based on the detection result of the second voltage detection unit 44, the voltage detection circuit 42 generates a high level second detection signal Sbus when the voltage of the bus power Vbus is higher than the second reference voltage and generates a low level second detection signal Sbus when the voltage of the bus power Vbus is lower than the second reference voltage.

Accordingly, the voltage detection circuit 42 is supplied with the synthesized power Vor based on the detection results of the first voltage detection unit 43 and the second voltage detection unit 44. That is, a high level first detection signal Sor is output when at least one of the bus power Vbus and battery power Vbt is supplied, and a low level first detection signal Sor is output when the synthesized power Vor is not supplied. In the same manner, the voltage detection circuit 42 outputs a high level second detection signal Sbus when the bus power Vbus is supplied and a low level second detection signal Sbus when the bus power Vbus is not supplied. Actually, the voltage detection circuit 42 outputs a low level first detection signal Sor when the synthesized power Vor is supplied but its voltage is less than the reference voltage. In the same manner, the voltage detection circuit 42 outputs a low level second detection signal Sbus when the synthesized power Vor is supplied but the voltage of the bus power Vbus is less than the reference voltage.

Furthermore, the voltage detection circuit 42 outputs a high level first detection signal Sor after outputting a high level second detection signal Sbus when detecting the bus power Vbus based on the detection result of the second voltage detection unit 44. For example, the voltage detection circuit 42 outputs a high level second detection signal Sbus and outputs a high level first detection signal Sor after a predetermined time has elapsed from the output of the second detection signal. Moreover, the first detection signal Sor and second detection signal Sbus may be output through a different configuration.

Figures 3, 4:
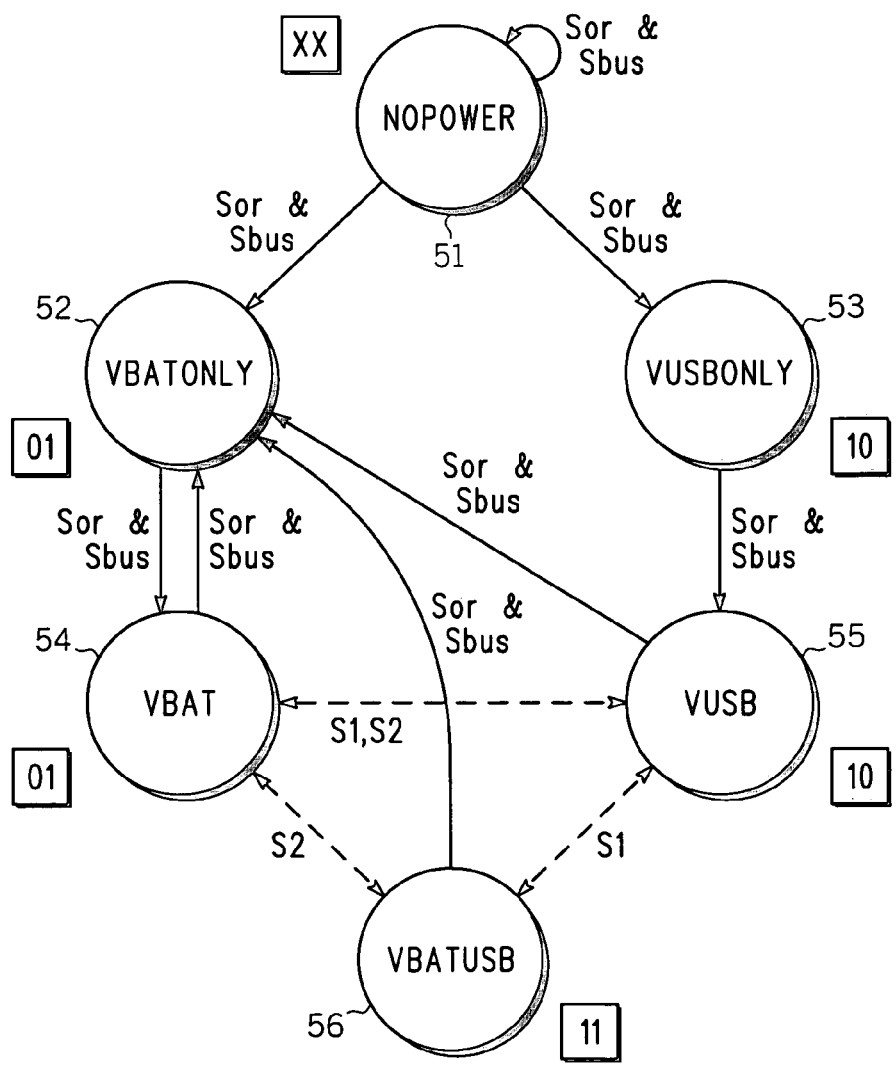
FIG. 3 is a table illustrating the operation of the control circuit.
FIG. 4 is a diagram showing the shifting of states in the control circuit.

The signal generation circuit 45, which is operated by the synthesized power Vor, receives the first detection signal Sor and the second detection signal Sbus. FIG. 3 is a table illustrating the operation of the signal generation circuit 45. The signal generation circuit 45 generates a set signal set1 and a clear signal clr1 (first signal pair), which are provided to the first FF circuit 46, and generates a set signal set2 and a clear signal clr2 (second signal pair), which are provided to the second FF circuit 47, in accordance with the logical equations shown below.

Clr1=/Sor&Sbus

Set1=/Sbus clr2=/Sbus

Set2=/Sor&Sbus

In the logical equations, "/" represents a low level ("0" in the table), and "&" represents logical AND.

Accordingly, for example, the signal generation circuit 45 outputs a high first clear signal clr1 when the first detection signal Sor is low ("0" in the table) and the section detection signal Sbus is high ("1" in the table). When the first detection signal is low and the second detection signal Sbus is high, that is, when the synthesized power Vor is not detected and the bus power Vbus is detected, the signal generation circuit 45 outputs a high level first detection signal Sor after outputting a high level second detection signal Sbus if the voltage detection circuit 42 detects the bus power Vbus. Therefore, when at least the bus power Vbus is supplied, the output signal of the second FF circuit 47 activates the second switch device SW2, which corresponds to the bus power Vbus.

The first FF circuit 46, which functions as a first holding circuit, has a positive logic output terminal Q, connected to the control terminal of the first switch device SW1, for outputting a first control signal C1 to the first switch device SW1. The second FF circuit 47, which functions as a second holding circuit, has a positive logic output terminal Q, connected to the control terminal of the second switch device SW2, for outputting a second control signal C2 to the second switch device SW2.

The first FF circuit 46 and second FF circuit 47 are D flip-flop circuits including a clear input terminal and a preset input terminal. Accordingly, the first FF circuit 46 outputs a low level control signal C1 when a clear signal clr1 having a predetermined level (for example, high level) is input to the clear input terminal and outputs a high level control signal C1 when a set signal set1 having a predetermined level (high level) is input to the preset input terminal.

In the same manner, the second FF circuit 47 outputs a low level control signal C2 when the clear signal clr2 having a predetermined level (for example, high level) is input to the clear input terminal and outputs a high level control signal C2 when a set signal set2 having a predetermined level (high level) is input to the preset input terminal.

The first switch device SW1 and the second switch device SW2 are activated in response to high level control signals C1 and C2 and inactivated in response to low level control signals C1 and C2. Therefore, the signal generation circuit 45 controls the activation and inactivation of the first switch device SW21 and the second switch device SW2 by providing the first FF circuit 46 and second FF circuit 47 with the set signals set1 and set2 and the clear signals clr1 and clr2, which have logic levels set based on the two detection signals Sor and Sbus.

The first FF circuit 46 and the second FF circuit 47 directly shift the level of the output signal, regardless of the clock signal, with the signals input to the clear input terminal and preset input terminal. That is, the signal generation circuit 45 controls the activation and inactivation of the first switch device SW1 and second switch device SW2 in an asynchronous manner.

A clock signal clk, which is output from the device main body 23 shown in FIG. 1, is input to the clock input terminals of the first FF circuit 46 and the second FF circuit 47. A command signal S1, which is output from the device main body 23, is input to the data input terminal of the first FF circuit 46. A command signal S2, which is output from the device main body 23, is input to the data input terminal of the second FF circuit 47. The first FF circuit 46 operates synchronously with the clock signal clk and outputs the control signal C1 with the same level as the command signal S1. In the same manner, the second FF circuit 47 operates synchronously with the clock signal clk and outputs the control signal C2 with the same level as the command signal S2.

The control circuit 35 shifts between a plurality of operating states and enters each operating states in accordance with the first detection signal Sor and the second detection signal Sbus. There are two-digit numbers marked in a square frame in the vicinity of each illustrated state. The second digit represents the state of the first switch device SW1, and the first digit represents the state of the second switch device SW2, in which "1" represents activation of switch device and "0" represents inactivation of the switch device.

First, when the first detection signal Sor and the second detection signal Sbus are both low (/Sor, /Sbus), the control circuit 35 is in state 51. State 51 is a "No Power" state in which no power source exists, that is, the power supply is not activated.

In state 51, when the bus power Vbus or the battery power Vbt go on and the synthesized power Vor or bus power Vbus is detected, the control circuit 35 shifts to state 52 or state 53. When the synthesized power Vor is detected and the bus power Vbus is not detected (Sor&/Sbus), the control circuit 35 shifts to state 52. In state 52, the first switch device SW1 is activated and the second switch device SW2 is inactivated. This supplies internal power Vin to the device main body 23 with the battery power Vbt of the battery 31, as shown in FIG. 1. In this state, only the battery power Vbt is supplied (VBATONLY).

In state 51, when the synthesized power Vor is not detected and the bus power Vbus is detected (/Sor&Sbus), the control circuit 35 shifts to state 53. In state 53, the first switch device SW1 is inactivated and the second switch device SW2 is inactivated. This supplies the internal power Vin to the device main body 23 with the bus power Vbus supplied from the PC 13 through the cable 12, as shown in FIG. 1. In this state, only the bus power vbus is supplied (VUSBONLY).

In state 52, when the bus power Vbus is detected (Sor&Sbus), the control circuit 35 shifts to state 54. In state 54, the device main body 23 is supplied with the internal power Vin generated with the battery power Vbt of the battery 31. Thus, the control circuit 35 does not shift the states of the first and second switch devices SW1 and SW2. In this state, the battery power Vbt and bus power Vbus are supplied. However, the internal power Vin is supplied based on the battery power Vbt (VBAT).

In state 54, when the bus power Vbus is not detected (Sor&/Sbus), the control circuit 35 shifts to state 52. The states of the switch devices SW1 and SW2 do not change when there is a shift from state 52 to state 54. Thus, the control circuit 35 only shifts states. Since the switch devices SW1 or SW2 do not perform switching, the internal power Vin based on the battery power Vbt of the battery 31 is continuously and stably supplied.

In state 53, when the synthesized power Vor is detected (Sor&Sbus), the control circuit 35 shifts to state 55. In state 55, the internal power Vin is supplied to the body 23 with the bus power Vbus. Thus, the control circuit 35 does not change the states of the switch devices SW1 and SW2. That is, the internal power Vin is supplied with the bus power Vbus although the battery power Vbt and bus power Vbus are supplied (VUSB).

In state 55, when the bus power Vbus is not detected (Sor&/Sbus), the control circuit 35 shifts to state 52, in which the first switch device SW1 is activated and the second switch device SW2 is inactivated. This supplies the internal power Vin to the device main body 23 with the battery power Vbt of the battery 31.

In state 54, when the command signals S1 and S2 are input from the device main body 23 shown in FIG. 1, the control circuit 35 shifts to state 55 in accordance with the command signals S1 and S2. After shifting to state 55, the control circuit 35 inactivates the first switch device SW1 and activates the second switch device SW2. This supplies the internal power Vin to the device main body 23 with the battery power Vbt from the battery 31.

In the same manner, in state 55, when the command signals S1 and S2 are input from the device main body 23, the control circuit 35 shifts to state 54 in accordance with the command signals S1 and S2. After shifting to state 54, the control circuit 35 activates the first switch device SW1 and inactivates the second switch device SW2. This supplies the internal power Vin to the device main body 23 with the bus power Vbus from the PC 13 through the cable 12.

In state 54, when the command signal S2 is input from the device main body 23 shown in FIG. 1, the control circuit 35 shifts to state 56 in accordance with the command signal S2. In state 56, the control circuit 35 activates the second switch device SW2. That is, the control circuit 35 activates the first switch device SW1 and the second switch device SW2. Thus, in state 56, the battery power Vbt and the bus power Vbus are supplied, and the internal power Vin is supplied with the battery power Vbt and bus power Vbus (VBATUSB).

In the same manner, in state 55, when the command signal S1 is input from the device main body 23, the control circuit 35 shifts to state 56 in accordance with the command signal S1. In state 56, the control circuit 35 activates the first switch device SW1. That is, the control circuit 35 activates the first switch device SW1 and the second switch device SW2.

In state 56, when the bus power Vbus is not detected (Sor&/Sbus), the control circuit 35 shifts to state 52 and inactivates the second switch device SW2. Since the first switch device SW1 is activated, the internal power Vin is supplied to the device main body 23 with the battery power Vbt of the battery 31.

States 52 and 53 are determined only by the state of the supplied power and are not dependent on the control of the MCU of the device main body 23. Thus, power is supplied to the device main body 23 by controlling the switch devices SW1 and SW2 even when power is not supplied to the MCU. States 54, 55, and 56 may be shifted in any manner by the control of the MCU, and the first switch device SW1 and second switch device SW2 are switched in accordance with each state. Thus, power is supplied in accordance with the operation of the MCU. Furthermore, in states 54, 55, and 56, when bus power Vbus is not supplied and thus not detected, the control circuit 35 shifts to state 52 independent of the control of the MCU. Therefore, when the internal power Vin is supplied by the bus power Vbus, the internal power Vin may be supplied to the device main body 23 by controlling the switch devices SW1 and SW2 to supply the internal power Vin with the battery power Vbt even if the bus power Vbus is cut off.

The preferred embodiment has the advantages described below.

The control circuit 35 includes the power synthesizing circuit 41, which generates the synthesized power Vor as a third power by synthesizing the first power V1 supplied from the regulator 33 and the second power V2 supplied from the regulator 34, or the battery power Vbt and the bus power Vbus, such that the circuits 42 through 47 of the control circuit 35 are operate by the synthesized power Vor. Accordingly, operation is enabled even when the supply of one power is stopped, and the first switch device SW1 and second switch device SW2 are continuously controllable. Furthermore, power is consumed efficiently since the activation and inactivation of the first switch device SW1 and second switch device SW2 may be controlled, that is, the cutting of one power is ensured.

The signal generation circuit 45 of the control circuit 35 generates the set signal set1 and the clear signal clr1 (first signal pair), which are supplied to the first FF circuit 46, and the set signal set2 and the clear signal clr2 (second signal pair), which are supplied to the second FF circuit 47, based on the first detection signal Sor and second detection signal Sbus output from the voltage detection circuit 42. The first FF circuit 46 and the second FF circuit 47 are D flip-flop circuits including a clear input terminal and preset input terminal. Further, the first FF circuit 46 and the second FF circuit 47 output low level command signals C1 and C2 when the clear signals clr1 and clr2 having a predetermined level (for example, high level) are input to the clear input terminal, and output high level command signals C1 and C2 when set signals set1 and set2 having a predetermined level (high level) are input to the preset input terminal. The first switch device SW1 and second switch device SW2 are activated in response to the high level command signals C1 and C2 and inactivated in response to low level command signals C1 and C2. Therefore, the signal generation circuit 45 controls the activation and inactivation of the first switch device SW1 and second switch device SW2 by providing the first FF circuit 46 and second FF circuit 47 with the set signals set1 and set2 and the clear signals clr1 and clr2 having logic levels set based on the two detection signals Sor and Sbus.

Accordingly, the control circuit 35 controls the activation and inactivation of the first switch device SW1 and the second switch device SW2 in accordance with the voltage of the synthesized power Vor and the bus power Vbus. Thus, an appropriate power source (the battery 31 or the PC 13) is selected in accordance with the currently supplied power to continuously supply power.

When a change in the voltage of the synthesized power Vor and in the voltage of the bus power Vbus is detected by the first voltage detection unit 43 and second voltage detection unit 44, the control circuit 35 shifts the clear signals clr1 and clr2 and the set signals set1 and set2 that are provided to the first FF circuit 46 and the second FF circuit 47. Therefore, when the supplied power is constant, the control circuit 35 operates in a static manner and does not consume much power. Accordingly, in the power synthesizing circuit 41 for generating the synthesized power Vor with the diodes D1 and D2, power loss in the diodes D1 and D2 does not affect power consumption and prevents the efficiency from being decreased.

The clock signal clk from the device main body 23 is input to the clock input terminals of the first FF circuit 46 and the second FF circuit 47. The command signal S1 from the device main body 23 is input to the data input terminal of the first FF circuit 46, and the command signal S2 from the device main body 23 is input to the data input terminal of the second FF circuit 47. The first FF circuit 46 operates synchronously with the clock signal clk and outputs a control signal C1 having the same signal level as the command signal S1. In the same manner, the second FF circuit 47 operates synchronously with the clock signal clk and outputs the command signal C2 having the same signal level as the command signal S2. Accordingly, the activation and inactivation of the first switch device SW1 and the second switch device SW2 are controlled by the device main body 23.

The control circuit 35 controls the activation and inactivation of the first switch device SW1 and the second switch device SW2 in accordance with the detected voltage when either one of the synthesized power Vor and the bus power Vbus is detected. Then, when both of the synthesized power Vor and bus power Vbus are detected and the second switch device SW2 corresponding to the bus power Vbus is activated, the control circuit 35 activates the first switch device SW1 corresponding to the battery power Vbt if the bus power Vbus is not detected. Therefore, when both of the battery power Vbt and bus power Vbus are supplied and the second switch device SW2 is activated to operate the device main body 23 with the bus power Vbus, if, for example, the cable 12 is unplugged and the bus power Vbus is no longer detected, the control circuit 35 supplies the device main body 23 with the first power V1 with the battery power Vbt by activating the first switch device SW1. This continuously operates the device main body 23.

It should be apparent to those skilled in the art that the present invention may be embodied in many other specific forms without departing from the spirit or scope of the invention. Particularly, it should be understood that the present invention may be embodied in the following forms.

In the preferred embodiment, the present invention is embodied in an electronic device including a USB standard interface circuit 21. However, the present invention may be embodied in an electronic device including an interface circuit of another standard or type, such as the Institute of Electrical and Electronics Engineers (IEEE) standard 1394, as long as power is supplied from an external device to the electronic device.

In the preferred embodiment, the interface circuit 21 does not necessarily have to be provided with a communication function.

The levels of each signal described in the preferred embodiment are not limited and may be changed as required.

The present examples and embodiments are to be considered as illustrative and not restrictive, and the invention is not to be limited to the details given herein, but may be modified within the scope and equivalence of the appended claims.

What is claimed is:

1. A power supply circuit for supplying power to a device main body, the power supply circuit, comprising:

a battery that provides a battery voltage;

a first regulator, connected to the battery, that receives the battery voltage and adjusts and stabilizes the battery voltage to generate a first voltage;

a second regulator connected to a bus interface circuit that receives a bus voltage by way of a communications bus, wherein the second regulator adjusts and stabilizes the bus voltage to generate a second voltage;

a first switch having a first terminal connected to an output of the first regulator and a second terminal connected to the device main body for supplying an input voltage to the device main body, wherein the first switch is activated with a first control signal;

a second switch having a first terminal connected to an output of the second regulator and a second terminal connected to the second terminal of the first switch, wherein the second switch is activated with a second control signal; and a control circuit for controlling the first and second switches, wherein the control circuit includes, a power synthesizing circuit having a first diode having an input connected to an output of the first regulator and receiving the first voltage and a second diode having an input connected to the second regulator and receiving the second voltage, wherein the outputs of the first and second diodes are connected to each other and provide a synthesized voltage;

a dynamic voltage detection circuit including a first voltage detection unit that receives the synthesized voltage and compares it to a first reference voltage and generates a first detection signal, and a second voltage detection unit that receives the bus voltage and compares the bus voltage to a second reference voltage and generates a second detection signal, wherein the first detection signal is active when the synthesized voltage is greater than the first reference voltage and the second detection signal is active when the second voltage is greater than the second reference voltage;

a signal generation unit that receives the first and second detection signals and generates first and second signal pairs therefrom, wherein each signal pair includes a set signal and a clear signal and wherein the first clear signal is active when the first detection signal is inactive and the second detection signal is active, the first set signal is active when the second detection signal is inactive, the second clear signal is active when the second detection signal is inactive, and the second set signal is active when the first detection signal is inactive and the second detection signal is active;

a first holding circuit for outputting and holding the first control signal based on the first signal pair, wherein the first holding circuit outputs the first control signal in accordance with a first command signal received from the device main body; and a second holding circuit for outputting and holding the second control signal based on the second signal pair, wherein the second holding circuit outputs the second control signal in accordance with a second command signal received from the device main body, whereby the first and second switches operate in a complementary manner to provide a selected one of the first and second voltages to the device main body.

2. The power supply circuit of claim 1, wherein the communications bus comprises a Universal Serial Bus compatible bus.

* * * * *